United States Patent [19]

Chou et al.

[11] Patent Number: 5,626,887
[45] Date of Patent: May 6, 1997

[54] AIR EXHAUST MOLD PLUNGER

[75] Inventors: C. H. Chou, Taipei; T. H. Wang; C. S. Chen, both of Taipei Hsien, all of Taiwan

[73] Assignee: Texas Instruments Incorporated, Dallas, Tex.

[21] Appl. No.: 327,737

[22] Filed: Oct. 24, 1994

[51] Int. Cl.$^6$ .......................... B29C 45/02; B29C 45/34
[52] U.S. Cl. .............. 425/129.1; 425/544; 425/546; 425/812; 425/DIG. 228; 264/272.17; 249/141
[58] Field of Search ..................... 425/116, 129.1, 425/544, 546, 812, 588, DIG. 228; 264/272.17; 249/141

[56] References Cited

U.S. PATENT DOCUMENTS

| | | | |
|---|---|---|---|
| 4,431,047 | 2/1984 | Takeshima et al. | 425/812 |
| 4,714,423 | 12/1987 | Hattori et al. | 425/544 |
| 5,082,615 | 1/1992 | Sakai | 264/272.17 |
| 5,336,272 | 8/1994 | Tsutsumi et al. | 264/272.17 |
| 5,435,953 | 7/1995 | Osada et al. | 264/272.17 |
| 5,460,502 | 10/1995 | Majercak | 425/544 |

FOREIGN PATENT DOCUMENTS 59-201428  11/1984  Japan ..................... 264/272.17

*Primary Examiner*—Khanh P. Nguyen
*Attorney, Agent, or Firm*—W. James Brady, III; Richard L. Donaldson

[57] ABSTRACT

A plunger (22), used in a standard mold, has a vent seal device (23) and spring (24) that evacuates air through an exhaust port 26a, and channels 26 and 26b from the mold prior to moving the mold compound into the runner 27.

3 Claims, 5 Drawing Sheets

AIR EXHAUST MOLD PLUNGER

FIELD OF THE INVENTION

This invention relates to molds for encapsulating devices, and more particularly to a plunger used in injection molding that has an air exhaust valve to release air trapped in the mold pot between the mold compound and plunger.

BACKGROUND OF THE INVENTION

The transfer mold encapsulation process has been used with thermoset molding compounds, such as epoxy molding compounds, for about 30 years. Conventional transfer molds used in this process are typically high density molds with as few as 20 cavities to over 800 cavities per molded encapsulation shot. Both multi-plunger and single plunger systems are used.

The entrapment of air in mold compound introduces voids in the molded semiconductor package, producing defective devices, or devices that cannot pass inspection due to voids in the package surface.

SUMMARY OF THE INVENTION

The invention relates to a molding apparatus which includes a molding compound pot for holding mold compound, a bushing in said molding pot, a runner connected to said bushing for carrying mold compound to mold cavities, a plunger movably mounted in said bushing for forcing mold compound from said pot, and a vent seal mounted in said plunger, said vent seal movably mounted in a cavity in said plunger.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1A:
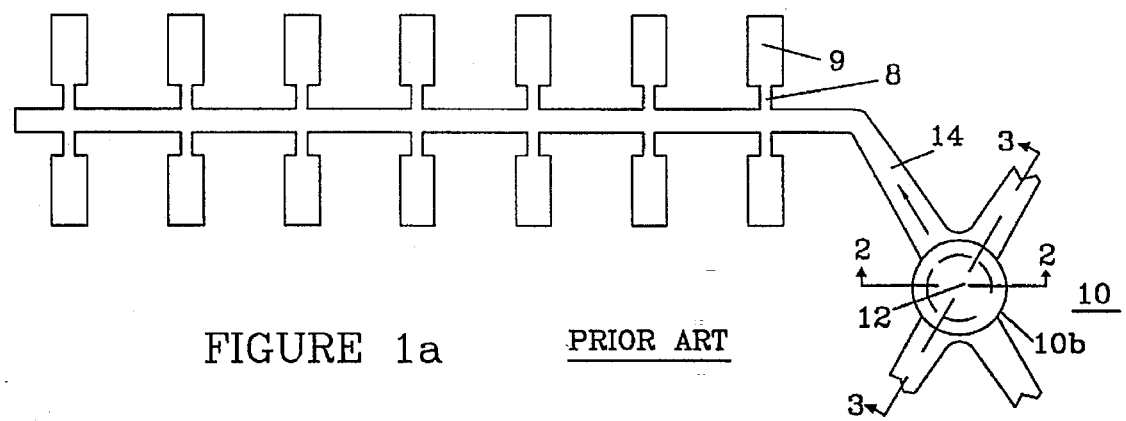
FIG. 1a shows a plunger connected to a runner and to mold cavities.

FIGS. 1a, 1b, 1c, 1d, 1e and 1f show a prior art molding apparatus. FIG. 1a schematically shows a lower transfer mold chase apparatus 10 for forcing mold compound from pot 10b via plunger 12 into runner 14 connected between the plunger 12 (shown in dashed line), gates 8 and the mold cavities 9.

Figures 1B, 1C:
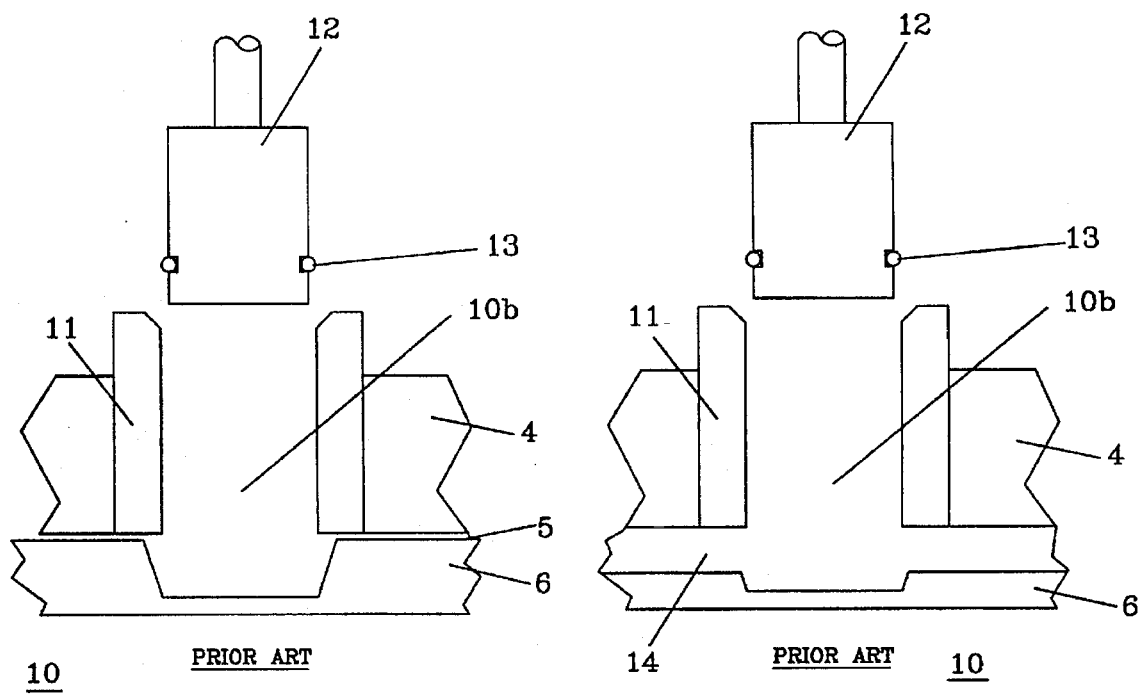
FIG. 1b is a cross-sectional view taken through section 2—2 of FIG. 1a showing the upper and lower parts of the mold.
FIG. 1c is a cross-sectional view taken through section 3—3 of FIG. 1a showing the runner connected to the mold pot.

FIG. 1b, taken through section 2—2 of FIG. 1a, shows several parts of mold 10. Mold 10 is shown with the upper mold part 4 separated from lower mold part 6 by parting line 5. Mold pot 10b is shown extending from within pot bushing 11 in the upper mold to the bottom mold 6. Plunger 12 is shown positioned above pot 10b.

FIG. 1c, taken through section 3—3 of FIG. 1a, shows upper and lower mold parts 4 and 6 clamped together with runner 14 extending from mold pot 10b.

Figure 1D:
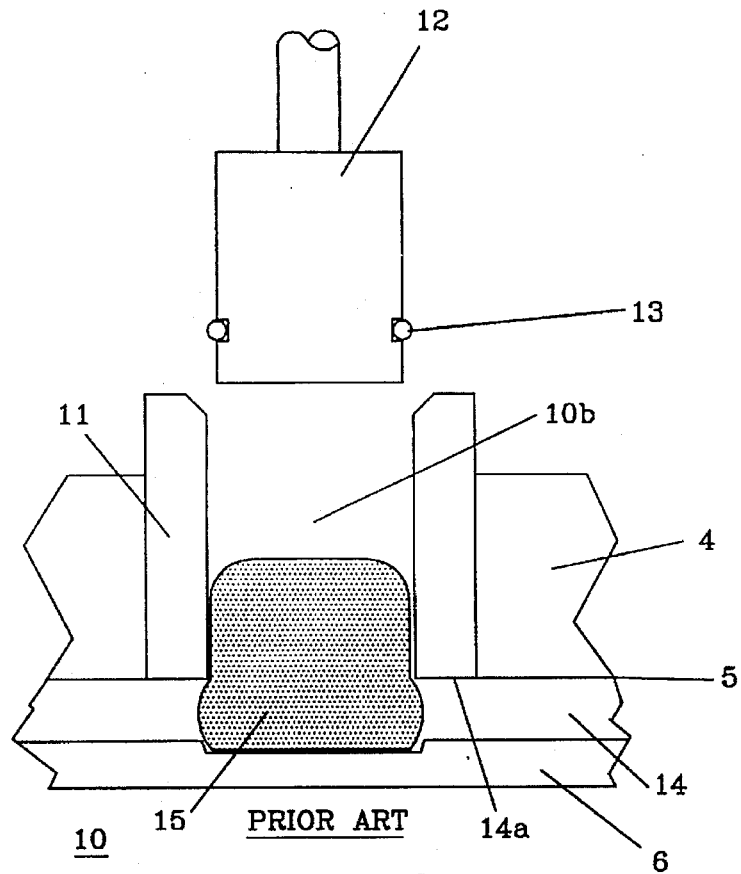
FIG. 1d illustrates a partial view of a prior art plunger, with the plunger raised and mold compound in place.

In FIG. 1d, plunger 12 is vertically above the pot 10b and pot bushing 11 and is pressed downward through the pot bushing 11 during transfer of molding compound pellet 15. Mold compound 15 is preheated before it is placed in the mold pot, and then with the additional application of heat and pressure, it is melted to a liquid state that can flow through runner 14 to mold cavities 9.

Figure 1E:
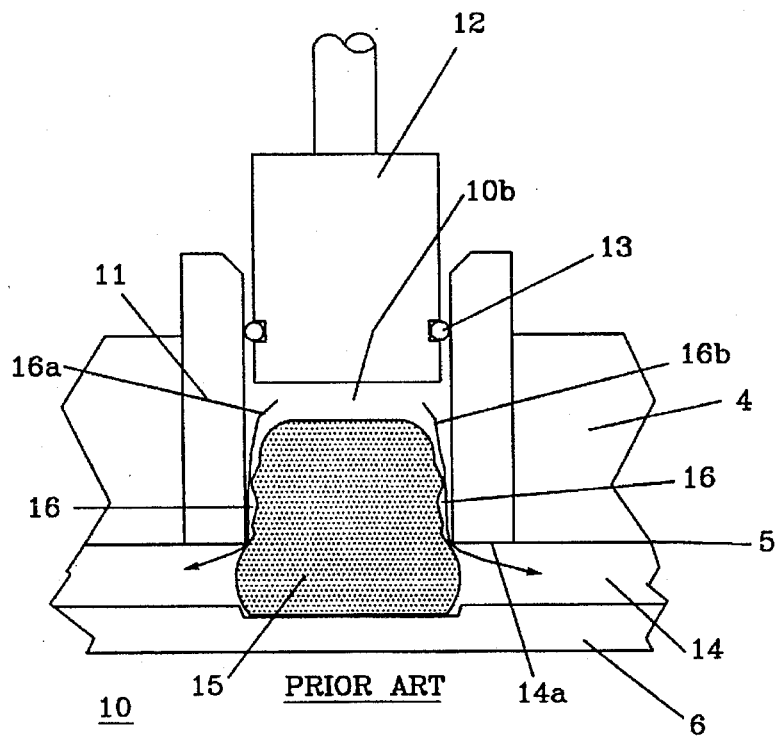
FIG. 1e illustrates the plunger of FIG. 1d lowered to move mold compound into the runner forcing air into the runner and entrapping air.

In FIG. 1e, mold apparatus 10 has a pot bushing 11, part of the upper mold, into which the plunger 12 is inserted to force mold compound 15 into runner 14. An O-ring 13 prevents the mold compound 15 and air from moving upward around plunger 12. This forces air in the mold pot 10b to be exhausted from the mold pot and flow around mold compound 15 into runner 14, as shown by arrows 16a and 16b. This air flow also causes air pockets between the mold compound 15 and bushing walls 11, as shown at 16.

Figure 1F:
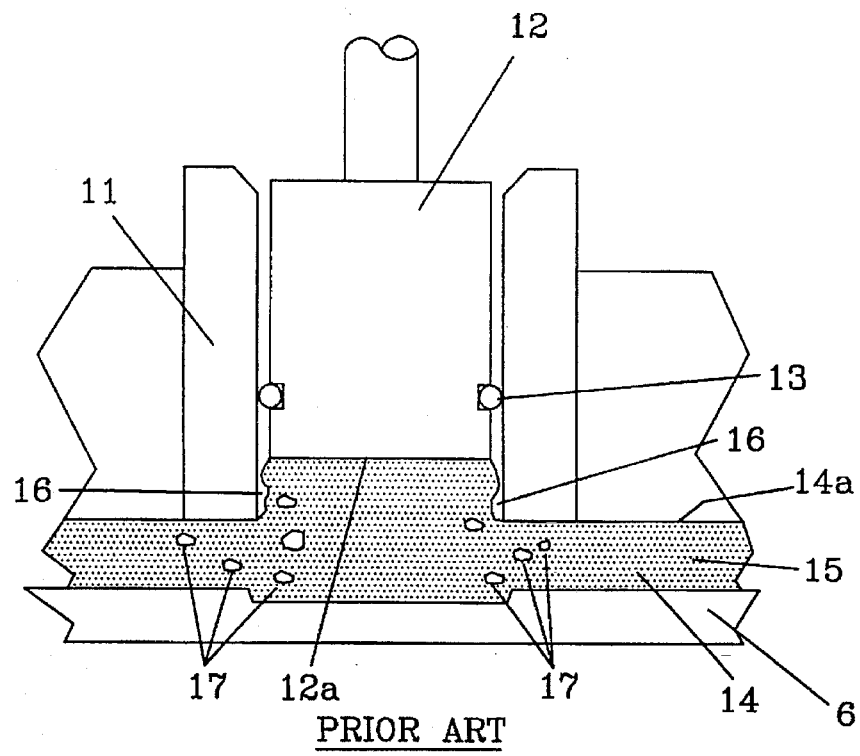
FIG. 1f shows the plunger in contact with the mold compound and entrapped air bubbles in the mold compound.

Referring to FIG. 1f, the air entrapped in runner 14 becomes voids 17 which are moved through runner 14 into the mold cavities 9 (FIG. 1). Air is entrapped at 16 which is forced into the mold compound to become the voids 17.

Figure 1G:
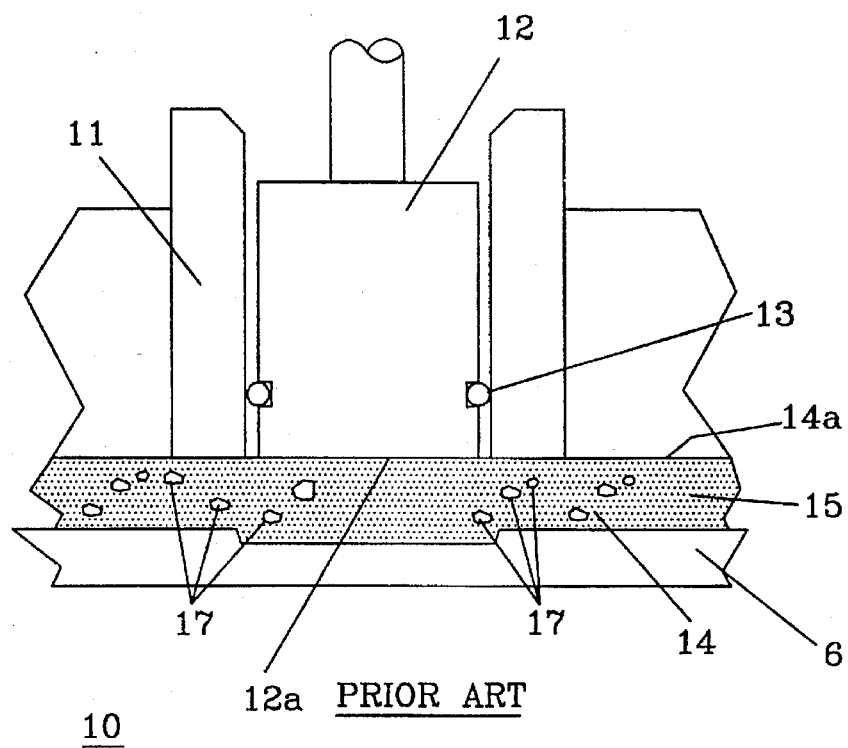
FIG. 1g shows the plunger in its final downward position.

FIG. 1g shows the plunger 12 at the bottom position. Plunger 12 normally does not enter the lower mold pot (lower part of mold pot 10b in lower mold part 6). The bottom side 12a of plunger 12 stops either at the upper wall 14a of runner 14, or at a small distance above the upper wall 14a, depending upon the amount of mold compound in the mold. Voids 17 move along with the mold compound 15 through runner 14 to the mold cavities, producing voids in the molded package.

Figure 2A:
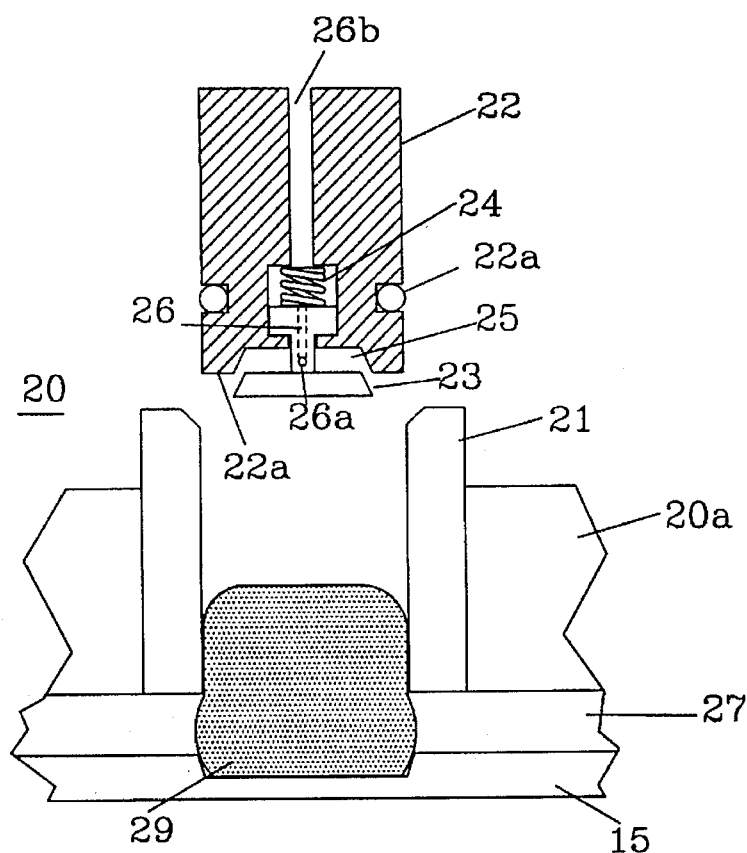
FIG. 2a illustrates a plunger according to the invention which utilizes a spring biased air exhaust vent in the mold plunger positioned over a molding compound pellet.

FIG. 2a illustrates a plunger 22 according to the invention that has a movable vent seal 23. Plunger 22 has a cavity 25 into which a movable vent 23 is placed. Above vent seal 23 is a spring 24 which biases vent seal in a downward position out of plunger cavity 25. Vent seal 23 has at least one opening 26a that is connected through channel 26, internal of vent seal 23, to outside of mold 20 through channel 26b in plunger 22.

Molding apparatus 20 has a pot bushing 21, part of the upper mold 20a, into which plunger 22 is inserted to force mold compound pellet 29 into runner 27. An O-ring 22a prevents the mold compound from moving upward around plunger 22. pellet 29, of molding compound, is placed in the pot bushing 21 under plunger 22. As plunger 22 is moved downward into mold compound pellet 29, pellet 29, melted by heat and pressure, is moved from the pot by plunger end 22a into runner 27, and subsequently into the mold cavities.

Figure 2B:
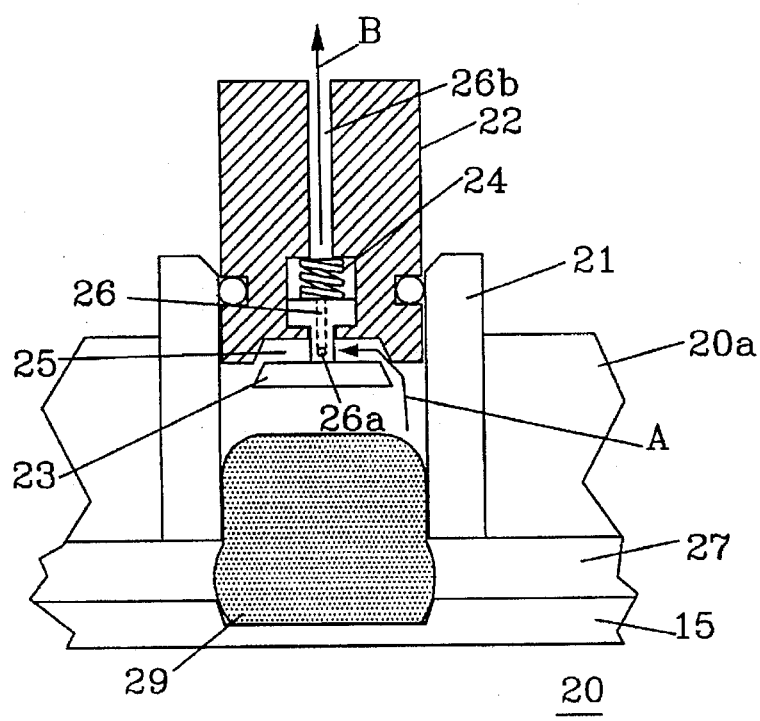
FIG. 2b shows the exhaust vent plunger piston of FIG. 2a moved into the mold compound runner.

FIG. 2b shows plunger 22 moved partially down into bushing 21. As plunger 22 is moved downward, air trapped between the bottom of plunger 22 and the top of mold compound 29 exhausts around vent seal 23, through opening 26a, and through channels 26 and 26b to the outside of mold 20, as indicated by arrows A and B.

Figure 2C:
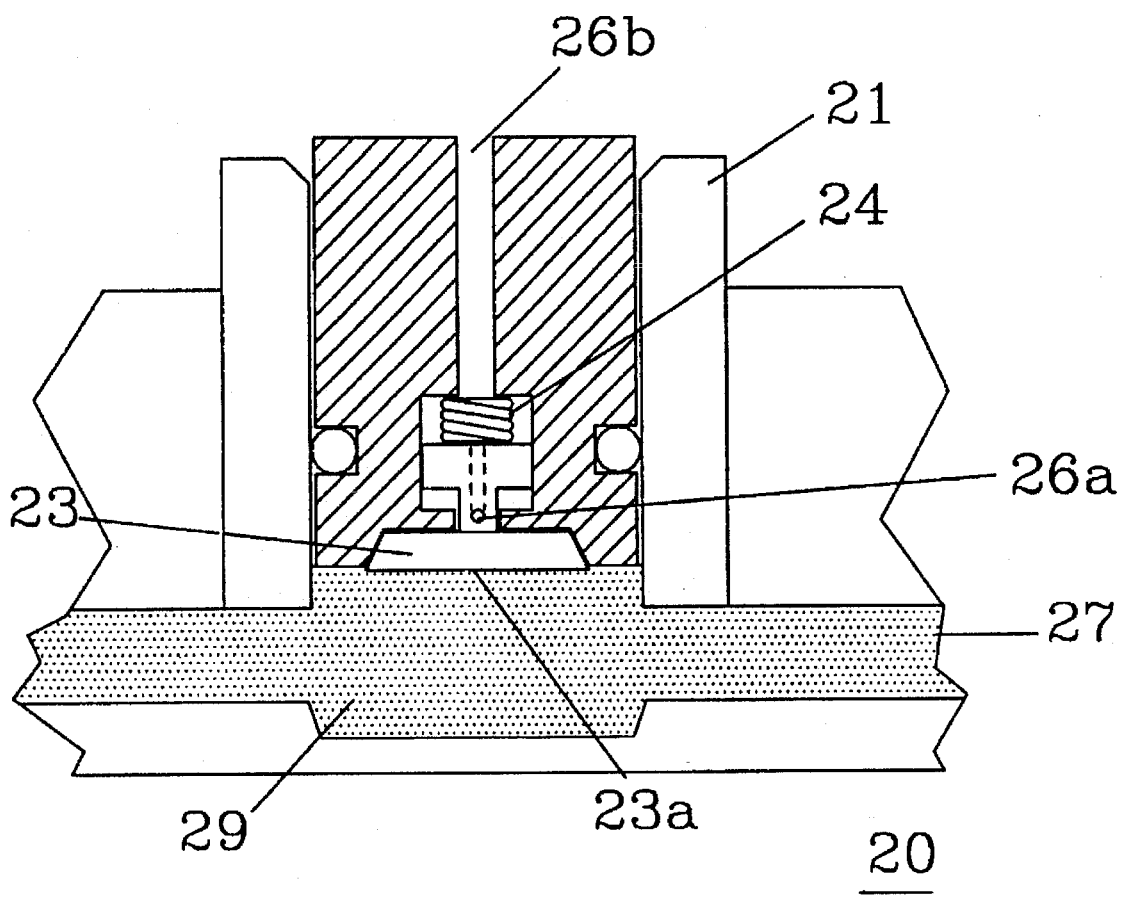
FIG. 2c shows the exhaust air plunger at the bottom of the pot in contact with the mold compound and with air exhausted from the pot.

FIG. 2c shows plunger 22 moved into contact with melted mold compound 29. As plunger 22 and vent seal 23 engage mold compound 29, the air in mold pot 20a has been vented. Vent seal 23 is pushed up into cavity 25, sealing off opening 26a from the inside of mold pot 20a, preventing mold compound from being forced into opening 26a. Since the air between plunger 22, and vent seal 23, has been exhausted, plunger 22 and vent seal lower surface 23a force the mold compound 29 into runner 27 without forcing air into runner 27, or forming air pockets in the mold compound.

What is claimed:

1. A molding apparatus, comprising:

a molding compound pot for holding mold compound;

a bushing in said molding pot;

a runner connected to said pot for carrying mold compound to mold cavities;

a plunger movably mounted in said bushing for forcing mold compound from said pot, said plunger having an end in which a cavity is formed and a first channel for venting air;

a vent seal attached to said plunger, said vent seal including a cavity sealing portion for sealing said cavity and a shaft attached to said cavity sealing portion, said shaft extending into said plunger, said shaft including a second channel for venting air to said first channel, said second channel having an opening in said shaft adjacent said cavity sealing portion; and a compressible member located in said plunger for biasing said shaft to a first position in which said cavity sealing portion is spaced from said cavity so as to vent air in said molding pot through said opening, said second channel and said first channel.

2. The molding apparatus according to claim 1, wherein said compressible member is a spring.

3. The molding apparatus according to claim 1, wherein said vent seal forms a bottom portion of said plunger.

* * * * *